United States Patent [19]
Martin

[11] 3,829,625
[45] Aug. 13, 1974

[54] SHUNT NEGATIVE IMPEDANCE AMPLIFIER

[76] Inventor: Stephen J. Martin, 1777 S. W. 17th, Miami, Fla. 33145

[22] Filed: May 15, 1972

[21] Appl. No.: 253,458

[52] U.S. Cl. ...... 179/170 G, 179/170 R, 179/1 CN, 333/80 T
[51] Int. Cl. .......................... H04b 3/36, H04b 3/16
[58] Field of Search ........ 179/170 G, 170 R, 170 T, 179/1 CN, 16 F; 333/80 R, 80 T

[56] References Cited

UNITED STATES PATENTS

| | | | |
|---|---|---|---|
| 2,870,271 | 1/1959 | Cronburg | 179/170 T |
| 3,135,829 | 6/1964 | Hultberg | 179/1 CN |
| 3,175,050 | 3/1965 | Oxman | 179/170 T |
| 3,300,738 | 1/1967 | Schlicke | 333/80 T |
| 3,566,046 | 2/1971 | McCormick | 179/170 R |
| 3,636,266 | 1/1972 | Martin | 179/170 G |

*Primary Examiner*—Kathleen H. Claffy
*Assistant Examiner*—Alan Faber
*Attorney, Agent, or Firm*—Anthony A. O'Brien

[57] ABSTRACT

A transmission line isolation and amplifier circuit is disclosed having a negative impedance line isolator and an amplifier with a common input/output port therebetween. First and second resistive networks are connected for biasing a transistor amplifier to provide a current gain which is converted by a transformer to a voltage gain and delivered to the common port. First and second capacitor means provide low impedance coupling between the common port and the transformer and transistor amplifier, respectively.

9 Claims, 2 Drawing Figures

PRIOR ART

SHUNT NEGATIVE IMPEDANCE AMPLIFIER

BACKGROUND OF THE INVENTION

1. Field of the Invention:

The present invention pertains to transmission line isolation and amplifying circuits, and more particularly to a negative impedance line isolator and amplifier circuit employing few components and exhibiting a high stable gain characteristic.

2. Description of Prior Art

In transmission lines, especially those used in telephone and cable distribution systems, a stable gain block that is bidirectional and permits raising levels in cable systems has long been an important design consideration. This becomes extremely critical in systems which simultaneously carry audio or radio frequency signals over many long distance branches where variations in the loading of the lines at various points cause reflections, deterioration of signal levels and a reduction of signal quality at other points in the system. A number of approaches have been previously proposed to provide effective line isolation, most of which rely on amplification of the signals at spaced intervals along the line to compensate for signal attenuation and provide impedance isolation. Such circuits are generally referred to as repeater circuits and can be categorized in bidirectional systems as being of either the Hybrid type or the Negative Impedance type. Previously published literature, for example, Dimmer, "Two Negative Impedance Voice Frequency Repeaters," *The Automatic Electrical Tech. Journal*, Vol. 4, No. 3, 12/55 pp 108–118, and Peard and Pierret, "Serial and Shunt Negative Impedances," IBM *Technical Disclosure Bulletin*, Vol. 8, No. 2, 7/65 p. 312, has noted that these systems suffer from line variations in impedance or loading which tends to make them unstable, cause regeneration or oscillations and degrade signals.

U.S. Pat. No. 3,636,266 describes a negative impedance line isolator which allows the stabilization and isolation of negative impedance amplifiers under varying line load and impedance changing conditions.

Even though the above discussed problem has been recognized for a long time, a simple circuit for providing stable gain and high impedance isolation has heretofore been unavailable.

SUMMARY OF THE INVENTION

It is an object of the present invention to construct a shunt bidirectional negative impedance line and conferencing amplifier that is stable in operation and low in cost to both produce and maintain.

The present invention has for an additional object to provide a shunt amplifier that is stable and has gain that permits raising levels in a standard telephone set.

It is a further object of the present invention to provide a bidirectional negative impedance shunt amplifier that raises levels on a telephone line when several telephones are being used at the same line (conferencing at a single location) thereby overcoming telephone losses when several instruments are on the same line.

It is a further object of this invention to construct a bidirectional negative impedance amplifier that will permit connecting together several telephone lines and overcoming interconnection losses when several lines are tied together at a single point (multiple line conferencing). The negative impedance isolator prevents line loading from varying due to a multiple line connection.

A further object of this invention is to construct a shunt amplifier that can be inserted in telephone transmission lines as a line extender to compensate for line losses in point to point telephone transmission circuits.

A further object of this invention is to construct a shunt amplifier that will increase levels in two wire intercommunications circuits having a common center point loading where multiple stations or lines enter a circuit i.e., two wire intercom systems.

A further object of this invention is to provide a shunt amplifier that will increase levels at different points in cable distribution systems of the type used in CATV and MATV systems (Community antenna television and master antenna television systems).

A further object of this invention is to construct a shunt bridging amplifier that will permit distribution of signals from a main feeder line to branching lines in CATV and MATV systems.

The present invention is characterized by a negative impedance line isolator and amplifier having a single transistor stage coupled to a common input/output point with the isolator. First and second resistive networks provide biasing for controlling the current gain of the amplifier which is converted to a voltage gain by a transformer before being delivered to the common point. First and second capacitors provide low impedance coupling between the transformer and transistor and the common point. The amplifier exhibits stable gain by controlling the effective load at which the amplifier operates.

BRIEF DESCRIPTION OF THE DRAWINGS

Further objects and advantages of the present invention will become apparent from the following description of the preferred embodiment when taken in conjunction with the accompanying drawings in which.

DESCRIPTION OF THE PREFERRED EMBODIMENT

For the purpose of clarity and simplicity of the drawings, the transformers normally employed to convert from balanced to unbalanced transmission have been deleted from the circuit, though any combination of balanced to unbalanced, two wire to four wire, coaxial, twisted pair or other types of cable transmission systems will operate with the circuit shown.

Figure 1:
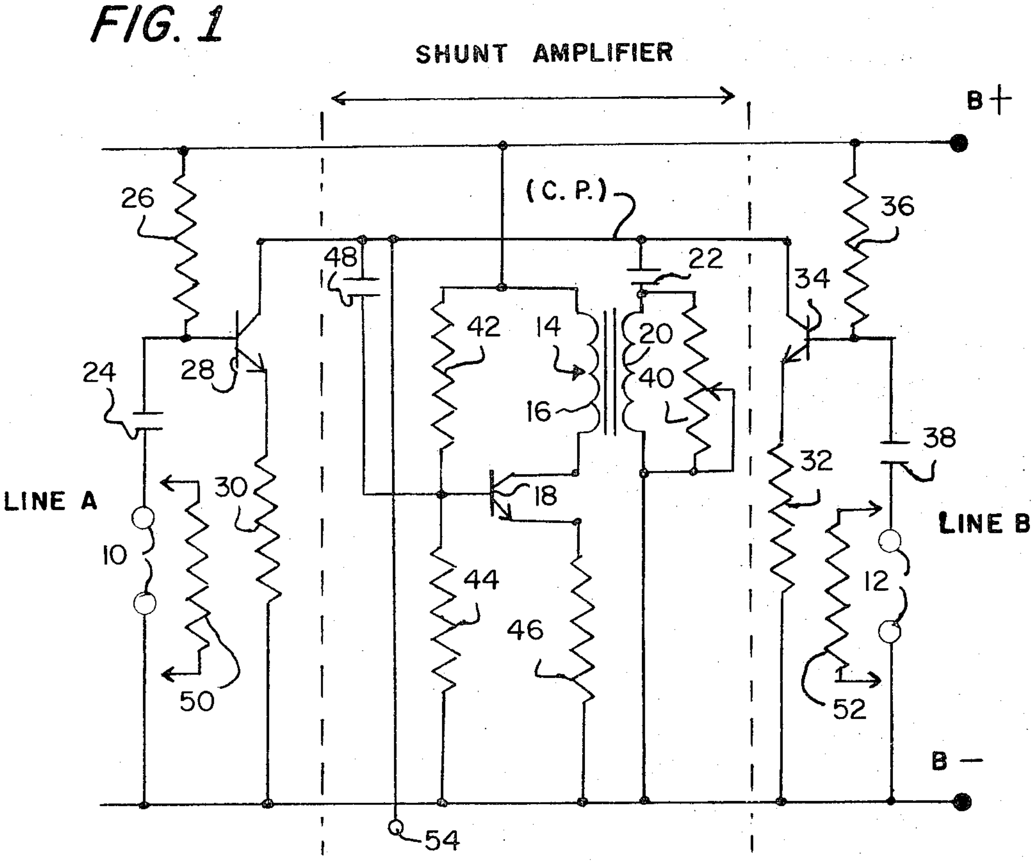
FIG. 1 is a schematic diagram of an embodiment of a negative impedance line isolator with a negative impedance shunt amplifier according to the present invention.

The present invention is embodied in a negative impedance shunt amplifier, schematically shown in FIG. 1, including terminal ports 10 and 12 adapted to be coupled to transmission lines A and B, respectively, in a communications network (not shown) such as a telephone system or radio frequency cable distribution system. A matching transformer 14 has primary winding 16 connected between the collector of transistor 18 and a B+ power supply line and a secondary winding 20 connected through an isolation capacitor 22, to the center point (C. P.) of a negative impedance isolator formed by capacitor 24, resistor 26, transistor 28, resistors 30 and 32, transistor 34, resistor 36 and capacitor 38, as described in the above mentioned U.S. Pat. No. 3,636,266. A variable resistor 40 is connected across and controls the effective impedance seen by the secondary winding 20 of the transformer thereby directly controlling the gain of the amplifier. Transistor 18 is biased by resistors 42 and 44 to a linear point approximately equivalent to half the supply voltage. Resistors 42 and 44 can be of the same value and form a voltage divider network from the transistor base to B+ and B− power supply lines. An emitter resistor 46 controls the effective internal impedance of the amplifier and causes transistor 18 to conduct and establishes the over-all gain of the amplifier by shifting operation to the correct current point in the dynamic operation curve for a given transistor. Manufacturers usually have a given current at which transistor Beta is measured. Capacitor 48 couples the output of the amplifier stage to the input of the amplifier stage, in phase, by connecting the base to the collector output point through the transformer as a phase shifter. Capacitor 22 DC isolates and couples the output of the amplifier to the common point or a transmission line. In this manner, both the output and the input of the amplifier are tied to the same point, isolated by the impedance relationship between the amplifier's effective internal impedance, as determined by emitter resistor 46, and the transformer secondary load, represented by variable resistor 40. In one experiment, for example, the following component values were found to provide satisfactory operation:

| | |
|---|---|
| Resistor 42 | = 15,000 ohms |
| Resistor 44 | = 15,000 ohms |
| Resistor 46 | = 470 ohms |
| Transistor 18 | = RCA 2N3053 |
| Capacitor 48 | = 100 μf |
| Capacitor 22 | = 100 μf |
| Transformer 14 | = 1 to 1 ratio, tightly coupled primary to secondary bifilar winding transformer, 5,000 ohms to 5,000 ohms primary to secondary impedance ratio (unloaded) |
| Variable resistor 40 | = 0 to 5,000 ohms variable. |

Under the above conditions, the gain of the 2N3053 transistor 18 was 20 decibels. The amplifier effective internal impedance was 470 ohms as fixed by resistor 46. The amplifier had a shunt gain of 0 to 20 decibels (as variable resistor 40 was varied from 470 ohms to 4,700 ohms) in a stable linear mode. Distortion was under 1%. A 12 VDC power supply was used though the device will operate over a wide range of voltages. The total output level swing of the device was approximately 50 percent of the maximum power supply voltage (this varies with transistor linearity). As described above, the amplifier of the present invention functions in a manner that can best be described as having the characteristics of a true negative impedance. The definition of a negative resistance is a condition in which as voltage decreases, current increases, as compared to a positive resistance where an increase in voltage always causes an increase in current. The amplifier can be shown to exhibit negative resistance. This can also be proven by examination of the wave form on an AC basis.

The addition of the negative impedance isolator mentioned above, further stabilizes the amplifier when used as a trunk repeater, conferencing unit or similar application, by isolating the common point where gain is generated from transmission circuits that can vary and are connected to terminals A and B. The amplifier, in essence, is connected to an isolated high impedance point where the amplifier load is controlled mostly by the value of resistor 40. It is a property of negative impedance line isolators, as covered in the above mentioned U.S. Pat. No. 3,636,266, to provide over 40 db of isolation between ports while preserving a high impedance at the common point. This transforms to a 5 percent or less variation of loading on the shunt amplifier under varying transmission line impedances. The effective impedance of the transmission lines can be simulated by resistors 50 and 52 in FIG. 1.

Figure 2:
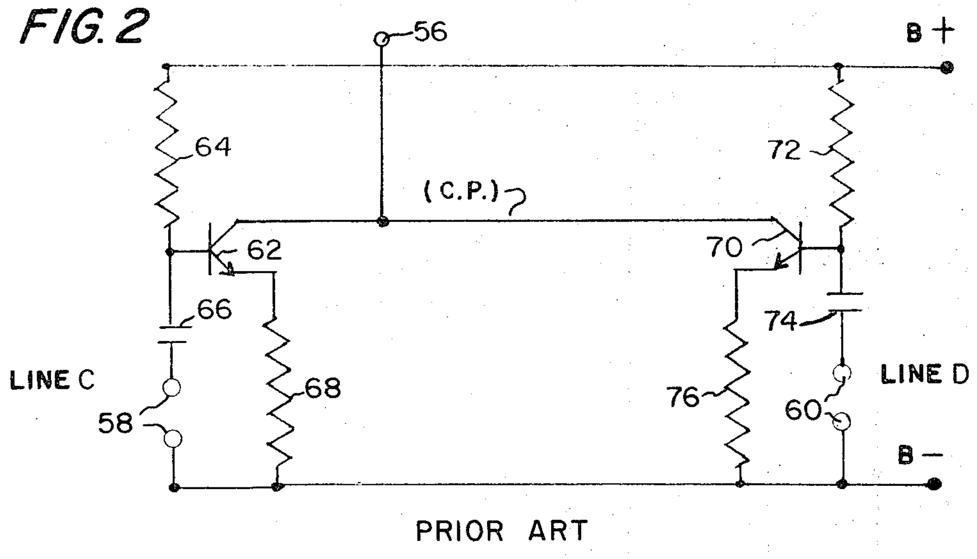
FIG. 2 is a schematic diagram of a second negative impedance line isolator with two ports and which may be added to the system of FIG. 1, having the shunt amplifier, to provide four line conferencing, bridging or distribution of signals.

FIG. 2 shows the addition of a second negative impedance line isolator, of the type described in U.S. Pat. No. 3,636,266, to form a four port or four way conferencing or distribution amplifier. The second negative impedance line isolator is connected to the first isolator by a line between terminals 54 and 56. The second isolator includes terminal ports 58 and 60 adapted to be connected to transmission lines C and D, respectively. Also included in the second isolator are transistor 62, resistor 64, capacitor 66, resistor 68, transistor 70, resistor 72, capacitor 74 and resistor 76.

Signals entering and leaving ports A, B, C and D split, combine and are amplified at the common point (C.P.) by the shunt amplifier. Isolation between ports to stabilize the shunt amplifier is given by the respective negative impedance isolators. Since the circuit of FIG. 2 functions identically to that of FIG. 1, a discussion of its operation will not be repeated.

The purpose of the invention on is to further isolate and stabilize the amplifier in transmission line circuits of the type used in telephone and radio frequency distribution systems, i.e., telephone and television systems, by having the negative impedance amplifier compensate for line losses and impedance variations by connecting it to the center point of a negative impedance line isolator, such as the one described in U.S. Pat. No. 3,636,266. The invention can be summarized in the following mathematical relationship; the amplifier itself will provide stable gain up to the point where the negative impedance characteristics of the amplifier cause the load to appear be equal to the effective internal impedance of the amplifier multiplied by the gain of the amplifier. The equation expressing this relationship is:

Effective gain = (load impedance/effective impedance) (transistor amplifier Beta or gain).

In other words, the amplifier will deliver stable gain up to the point where the load to which it is delivering gain appears to be equal to the effective impedance of the amplifier times the gain of the amplifier. As an example, in an amplifier having an effective internal impedance of 200 ohms, and using transistors with a Beta of 20 giving an effective gain of 20 decibels (or a voltage gain of 10) the amplifier will amplify in a stable mode when feeding a load of up to 2,000 ohms (200 ohms effective internal impedance times 10 equals 2,000 ohms). The amplifier is then used in a shunt configuration and will deliver a 20 db gain to a transmission line loss of 20 decibels or a line impedance of 2,000 ohms.

When used in conjunction with negative impedance line isolators, such as those described in U.S. Pat. No. 3,636,266, the line impedance can be accurately controlled by fixing the impedances at the different ports with negative impedance line isolators, further addition or substraction of lines, i.e., circuits coming in and out in telephone extensions or conferencing systems, does not affect the operation of the shunt amplifier if a negative impedance isolator is used with each connection point. The amplifier remains stable.

Inasmuch as the present invention is subject to many variations, modifications and changes in detail. it is intended that all matter contained in the foregoing description or shown in the accompanying drawing shall be interpreted as illustrative and not in a limiting sense.

What is claimed is:

1. A negative impedance shunt amplifier capable of simultaneous bidirectional transmissions comprising:
   power line means;
   a transistor having a base, emitter, and collector capable of producing a gain increased collector current in accordance with a flow of base current;
   means connected to said power line means for applying a bias to the base of said transistor;
   resistive network means connected to the transistor emitter to bias same and establish a given effective amplifier impedance;
   a common input/output port;
   transformer means including a primary winding connected between the collector of said transistor and said power line means and a secondary winding coupled to the primary winding for converting the gain increased collector current to a voltage signal which varies inversely with base current;
   low impedance coupling capacitor means coupling the secondary winding of the transformer means to the common input/output port for delivering said voltage signal thereto; and
   another low impedance coupling capacitor means coupling the common input/output port to the transistor base for in phase current amplification.

2. The invention as recited in claim 1 further comprising:
   a two port negative impedance line isolator connected to the common common input/output port of said shunt amplifier to form an isolated stable line amplifier for use as a line extender in telephone and cable distribution systems.

3. The invention as recited in claim 1 further comprising:
   at least two negative impedance line isolators connected to the common common input/outout port of said shunt amplifier to form multiple port conferencing and distribution networks in telephone and cable systems.

4. The invention as recited in claim 1 wherein said shunt amplifier is connected to a telephone line to act as a bidirectional telephone instrument booster amplifier for weak signals.

5. The invention as recited in claim 1 wherein the shunt amplifier is connected to a telephone line to act as a shunt amplifier and restore higher signal levels on said line when multiple telephone instruments are connected to the same line at a single location.

6. The invention as recited in claim 1 wherein a plurality of said shunt amplifiers are connected at spaced intervals along telephone lines and form parallel line extenders to make up for line losses.

7. The invention as recited in claim 1 wherein a plurality of said shunt amplifiers are connected at spaced intervals in cable systems of the type used for broadband television and data transmission to compensate for cable losses.

8. The invention as recited in claim 1 wherein the shunt amplifier is connected as an automatic level control device so that as cable losses increase and the shunt amplifier sees a higher load impedance the amplifier gives an equal direct and proportional increase selectively in gain and level thereby providing automatic level control.

9. The invention as recited in claim 1 wherein the means for applying a bias includes a resistive network connected to bias the base of said transistor at approximately half the energization of said power line means.

* * * * *